US007675967B2

(12) United States Patent
Wang

(10) Patent No.: US 7,675,967 B2
(45) Date of Patent: *Mar. 9, 2010

(54) TRAINING-WHILE-WORKING DATA COMMUNICATIONS

(75) Inventor: Zhenyu Wang, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/633,373

(22) Filed: Dec. 4, 2006

(65) Prior Publication Data

US 2007/0077953 A1 Apr. 5, 2007

Related U.S. Application Data

(63) Continuation of application No. 10/008,069, filed on Nov. 5, 2001, now Pat. No. 7,227,891.

(51) Int. Cl.
  H04B 1/38 (2006.01)
  H04L 5/16 (2006.01)
  H04Q 1/20 (2006.01)

(52) U.S. Cl. .................. 375/231; 375/222; 375/232; 375/219

(58) Field of Classification Search .......... 379/93.32, 379/93.35; 455/552.1; 375/231, 222, 219, 375/229, 232, 223
  See application file for complete search history.

(56) References Cited

U.S. PATENT DOCUMENTS

| 4,606,044 | A | | 8/1986 | Kudo | 379/22.02 |
|---|---|---|---|---|---|
| 5,479,480 | A | * | 12/1995 | Scott | 455/425 |
| 5,852,630 | A | * | 12/1998 | Langberg et al. | 375/219 |
| 5,903,603 | A | | 5/1999 | Kennedy et al. | 375/222 |
| 5,914,982 | A | * | 6/1999 | Bjarnason et al. | 375/222 |
| 5,991,269 | A | * | 11/1999 | Williamson et al. | 370/241 |
| 6,021,160 | A | * | 2/2000 | Kaku et al. | 375/231 |
| 6,052,412 | A | * | 4/2000 | Ruether et al. | 375/231 |
| 6,219,378 | B1 | | 4/2001 | Wu | 375/231 |
| 6,266,367 | B1 | * | 7/2001 | Strait | 375/229 |
| 6,314,135 | B1 | * | 11/2001 | Schneider et al. | 375/232 |
| 6,317,455 | B1 | * | 11/2001 | Williams et al. | 375/222 |
| 6,366,569 | B1 | * | 4/2002 | Ritter | 370/337 |
| 6,614,838 | B1 | * | 9/2003 | Bremer | 375/220 |
| 6,704,351 | B1 | * | 3/2004 | Ott et al. | 375/222 |
| 6,768,791 | B1 | * | 7/2004 | Olafsson et al. | 379/93.32 |
| 6,876,696 | B1 | * | 4/2005 | Goodson et al. | 375/219 |
| 2002/0075952 | A1 | * | 6/2002 | Verbin et al. | 375/231 |
| 2004/0013183 | A1 | * | 1/2004 | Bremer | 375/220 |
| 2004/0146148 | A1 | * | 7/2004 | Olafsson et al. | 379/93.32 |

* cited by examiner

Primary Examiner—Tilahun Gesesse
(74) Attorney, Agent, or Firm—Mendelsohn, Drucker & Assoc., P.C.; Kevin M. Drucker; Steve Mendelsohn

(57) ABSTRACT

A data communication transceiver, such as a PCM or xDSL modem, is operable in a training-while-working mode in which it both trains and communicates user data. In some embodiments, upon initiation of a data communication session, the transceiver operates in a startup training mode in which partial training occurs that is sufficient to enable low rate data communication; the transceiver then enters the training-while-working mode in which it communicates user data and completes training. When training is completed, the transceiver enters a data mode in which it communicates user data but does not train. In some embodiments, if in the data mode conditions arise requiring retraining or making retraining desirable, the transceiver enters the training-while-working mode and retrains while continuing to communicate user data.

36 Claims, 6 Drawing Sheets

TRAINING-WHILE-WORKING DATA COMMUNICATIONS

CROSS-REFERENCE TO RELATED APPLICATIONS

This application is a continuation of U.S. application Ser. No. 10/008,069, filed on Nov. 5, 2001 now U.S. Pat. No. 7,227,891, the teachings of which are incorporated herein by reference.

BACKGROUND OF THE INVENTION

1. Field of the Invention

The present invention relates to data communications. In particular, this invention relates to data communication transceivers that can be trained, and to methods for training such data communication transceivers.

2. Description of the Related Art

Current data communication transmitter-receivers ("transceivers"), such as pulse code modulation ("PCM")-based modems and digital subscriber line ("xDSL") modems, have two separate modes in which they may operate: a training mode and a data mode. When a data communication session commences between a pair of transceivers coupled by a communication channel, the transceivers initially operate in a training mode in which the receiver of each data communication transceiver is trained using predetermined signals. Receiver training in the training mode may include automatic gain control ("AGC"), timing recovery, echo cancellation, equalization, and channel learning training, and initial training for other adaptive algorithms. The training process attempts to adjust these functions for best performance in the communication environment. After training has been completed, the data communication transceivers exit the training mode and enter the data mode. In the data mode, user data transmitted by one data communication transceiver to the other is transmitted at a fixed rate that in the previous training mode was determined to be optimum. Adaptive algorithms may update in the data mode in response to changes in the communication environment. However, if communication is not stable in the data mode, for instance if the bit error rate is higher than expected, then the transceivers will go back to the training mode and retrain. After retraining, the transceivers return to the data mode, and further user data transmitted by one data communication transceiver to the other is transmitted at a fixed rate consistent with conditions existing in the communication channel during the retraining period.

Current data communication transceivers communicate (i.e., transmit and/or receive) user data only in the data mode, and do not communicate any user data while training or retraining in the training mode. In current modems such as PCM and xDSL modems, each training or retraining session can take a substantial amount of time, for instance 10-20 seconds. Communication channel conditions may require repeated retraining sessions during the course of a communication session. Retraining effectively disconnects and reconnects the transceiver, and many applications such as Internet audio, video, telephony, and multimedia applications suffer if communication sessions are subject to interruption such as occurs during retraining. These drawbacks result from the above-described method of operation of current data communication transceivers, which may be termed "training-then-working."

SUMMARY OF THE INVENTION

The present invention provides data communication transceivers, and methods for operating such data communication transceivers, that overcome certain drawbacks of the prior art "training-then-working" transceivers. In accordance with the present invention, a data communication transceiver is operable in a "training-while-working" mode in which it both trains and communicates user data. Training in the training-while-working mode may include training using user data and may include training using predetermined signals.

In one embodiment, the present invention is a data communication transceiver operable in a training-while-working mode, wherein transceiver training occurs and user data is communicated in the training-while-working mode.

In another embodiment, the present invention is a method of operating a data communication transceiver comprising the steps of communicating user data in a training-while-working mode, and training the data communication transceiver in the training-while-working mode.

BRIEF DESCRIPTION OF THE DRAWINGS

The foregoing and other aspects, features, and advantages of the present invention will become more fully apparent from the following detailed description, the appended claims, and the accompanying drawings in which:

DETAILED DESCRIPTION

Figure 1:
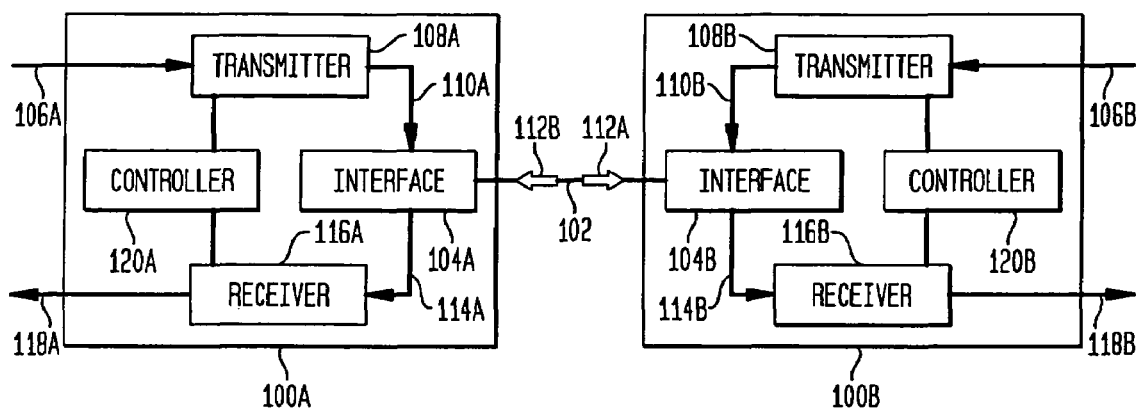
FIG. 1 is a schematic diagram illustrating the general features of a data communication system in which the present invention may be used.

FIG. 1 is a schematic diagram illustrating some general features of a data communication system in which the present invention may be used. FIG. 1 shows two data communication transceivers, 100A and 100B, that are coupled by communication channel 102 so that they may communicate with each other. While communication channel 102 may typically comprise an "upstream" and a "downstream" channel in a common physical medium, that is not necessarily the case, and the invention is not so limited; for example, communication channel 102 may rely on two distinct unidirectional links. As used herein the terms "upstream" and "downstream" are used merely to distinguish the two directions of communication between the transceivers, and not to imply any particular nature of or relationship between the transceivers. Elements in data communication transceiver 100A are indicated by reference numbers with the suffix "A", elements in data communication transceiver 100B are indicated by reference numbers with the suffix "B", and references to such elements generally or collectively are indicated without any suffix.

Each data communication transceiver 100 includes a transmitter 108 and a receiver 114 operating under control of a controller 120. Transmitter 108 and receiver 114 are each coupled to communication channel 102 by a communication channel interface 104. If communication channel 102 is a telephone local loop, then interface 104 may be a device commonly referred to as a "hybrid." Data that is to be communicated "downstream" from data communication transceiver 100A to data communication transceiver 100B is supplied as input data 106A to transmitter 108A. Transmitter 108A encodes and otherwise processes input data 106A to provide a signal 110A for transmission, and signal 110A is coupled to communication channel 102 by interface 104A. The signal 112A received by data communication transceiver 100B from communication channel 102 is coupled through interface 104B to the input of receiver 116B. Receiver input signal 114B is decoded and otherwise processed by receiver 116B to provide output data 118B that ideally is identical to input data 106A. Data that is to be communicated from data communication transceiver 100B to data communication transceiver 100A is supplied as input data 106B to transmitter 108B and is processed by corresponding elements analogous to the manner described above.

Figure 2:
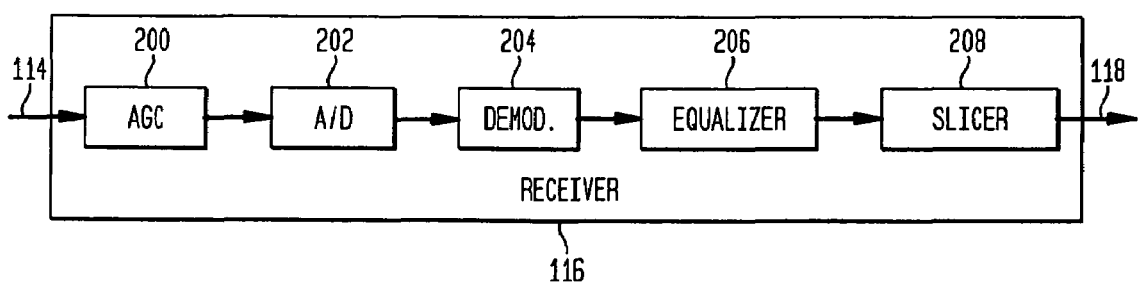
FIG. 2 is a schematic diagram illustrating some general features of a receiver that may be used in the data communication system of FIG. 1.

FIG. 2 is a schematic diagram illustrating some general features of a receiver that may be used in the data communication system of FIG. 1. The signal 114 supplied to the input of receiver 116 is supplied to AGC circuit 200 which adjusts the signal amplitude to be in an acceptable range for A/D converter 202. A/D converter 202 converts the received analog signal to a digital signal which is demodulated by demodulator 204. The demodulated signal is supplied to equalizer 206 which compensates the signal for noise and distortion arising in the generation and transmission of the signal. Slicer 208 assigns symbol values to the signal and generates output data 118 representing the symbols. The functional blocks illustrated in FIG. 2 are typical of some data communication transceivers, and such transceivers may include other functional elements that are not shown in FIG. 2.

The conditions of a particular data communication session, including the characteristics of the data communication transceivers 100 and the communication channel 102 and the noise arising in or coupled into the system, can result in communication errors in which output data 118 is different from the corresponding input data 106. Such conditions also can limit the rate at which data can be communicated with an acceptable error rate. To reduce such errors and/or to increase the rate at which data can be communicated with an acceptable error rate, as part of a data communication session, data communication receivers 116 may undergo a training process in which their functional elements are adjusted to account for or compensate for characteristics of the data communication transmitter 108, the communication channel 102, and noise in the system.

Figure 3:
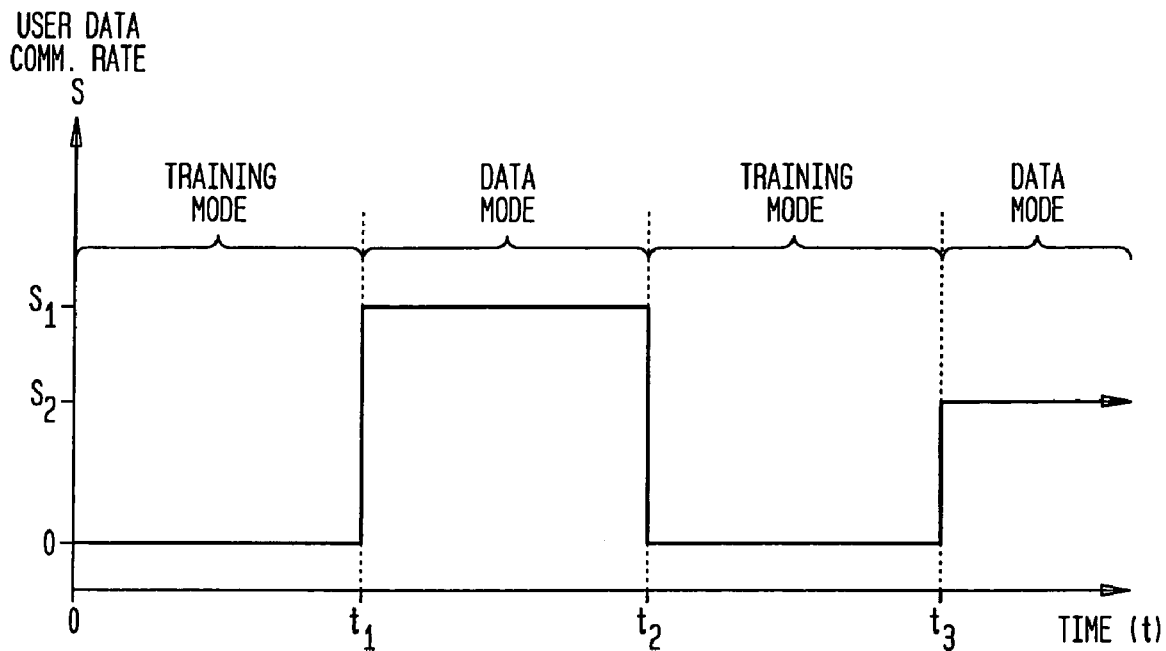
FIG. 3 is a graph illustrating the operation of a prior art data communication transceiver.
Figure 4:
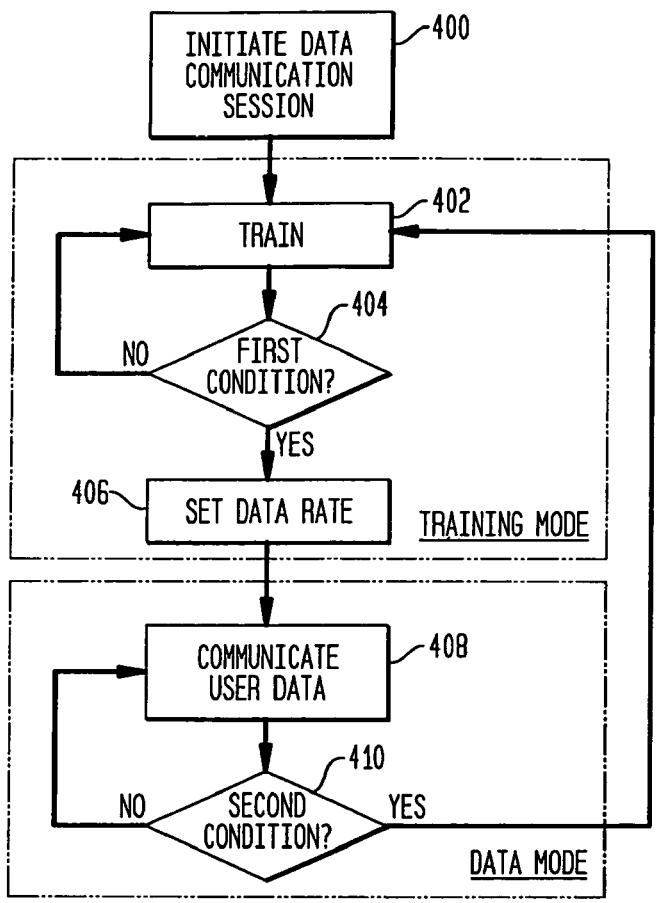
FIG. 4 is a flow diagram illustrating the operation of a prior art data communication transceiver.

FIGS. 3 and 4 illustrate the operation of a prior art data communication system comprising a prior art data communication transceiver in a data communication session with another co-operating prior art data communication transceiver. FIG. 3 is a graph of user data communication rate S versus time t that might occur in such a system between a transmitter and a receiver. FIG. 3 also sets forth the operating state of the data communication transmitter and the receiver during the time intervals depicted. FIG. 4 illustrates the operation of the data communication transceivers by means of a flow diagram. Both FIG. 3 and FIG. 4 will be referred to in the following discussion.

In the graph of FIG. 3, upon initiation of a data communication session (step 400 of FIG. 4), a pair of data communication transceivers enters a training mode at time t=0. As indicated in FIG. 3, while in the training mode, the user data communication rate S=0. The training mode comprises steps 402-406 of FIG. 4. In training step 402, one data communication transceiver generates signals that are predetermined; for instance, the signals may correspond to predetermined input data. The predetermined signals are coupled to the communication channel and transmitted to the other data communication transceiver, and are used as training signals. Because the receiver knows the predetermined signals that are to be sent during training, the receiver can adjust its signal processing functions based on the signals it receives during training to compensate for the characteristics of the communication environment, including the characteristics of the transmitter and the communication channel and any spurious signals or other noise in the signal presented to the receiver. For instance, the receiver knows the predetermined input data that may be used in generating training signals, and therefore the receiver knows the output data that it should generate in response to such training signals, and can adjust its signal processing functions so that it generates the proper output data upon receipt of signals corresponding to such data. The generation and transmission of training signals by a transmitter, and the receipt of corresponding signals and adjustment of signal processing functions by a receiver, are included in training step 402.

In the training mode, typical prior art data communication transceiver training includes AGC, timing recovery, echo cancellation, equalization, and channel learning training of the receiver, and initial training for adaptive algorithms that may operate in the data mode. Training adjusts the trained functions to attempt to optimize their performance in the communication environment existing during the training period. Training is performed in prior art systems until it is determined in step 404 that a first condition has occurred corresponding to the receiver being fully trained. For instance, training step 402 may be performed for a fixed period of time within which receiver-training algorithms are expected to be able to converge to stable conditions, or until a predetermined signal-to-noise ratio is achieved. After such time, signal-to-noise ratio, or other first condition is determined to exist, training is considered completed, and a data rate $S_1$ for use in user data communications is set in step 406. Data rate-setting step 406 typically comprises establishing a symbol constellation for use in the data mode, based on the performance of the receiver as trained in the training mode. Typically the symbol constellation is selected to provide the highest data rate supportable in the communication environment existing during the training period with the parameters to which the receiver was trained.

After the receiver has been fully trained and the data rate has been set, the data communication transceiver exits the training mode and enters the data mode, which occurs at time $t=t_1$ in FIG. 3. In the data mode, user data is communicated in step 408 at the rate $S_1$ that was determined in step 406 in the training mode. In prior art data communication transceivers, although certain processing steps may be adaptively updated in the data mode, the constellation used for communicating user data in the data mode is the constellation established in the previous training interval, and does not change while the data communication transceivers remain in the data mode.

FIG. 3 illustrates an event occurring at time $t_2$ wherein the data communication transceiver determines in step 410 that a second condition exists indicating that data communication is no longer supportable at rate $S_1$. Such a second condition may be, for instance, the bit error rate exceeding a predetermined value or the signal-to-noise ratio ("S/N") falling below a predetermined value, which may occur due to degradation of the environment in the communication channel while the data communication transceivers are in the data mode. Upon such a determination in step 410 that the second condition exists, the data communication transceivers reenter the training mode at step 402 for retraining. Retraining in step 402 readjusts the trained functions to compensate for conditions existing in the communication environment during the retraining period. After retraining is completed, as determined in step 404, a data rate $S_2$ is set in step 406 based on the performance of the receiver as retrained, and the data communication transceivers exit the training mode and re-enter the data mode at time $t=t_3$. Thereafter, in this particular example, user data is communicated in step 408 using a lower rate $S_2$ that is supportable in the communication environment existing during the retraining period $(t_2, t_3)$ with the parameters to which the data communication receiver was retrained. As with training, during retraining no user data is passed and therefore the user data communication rate $S=0$. During the course of a data communication session, many cycles of alternating training and user data communication may occur. FIG. 3 is intended to illustrate the general features of training and user data communication in the prior art, and it omits other features such as termination of the data communication session.

Figure 5:
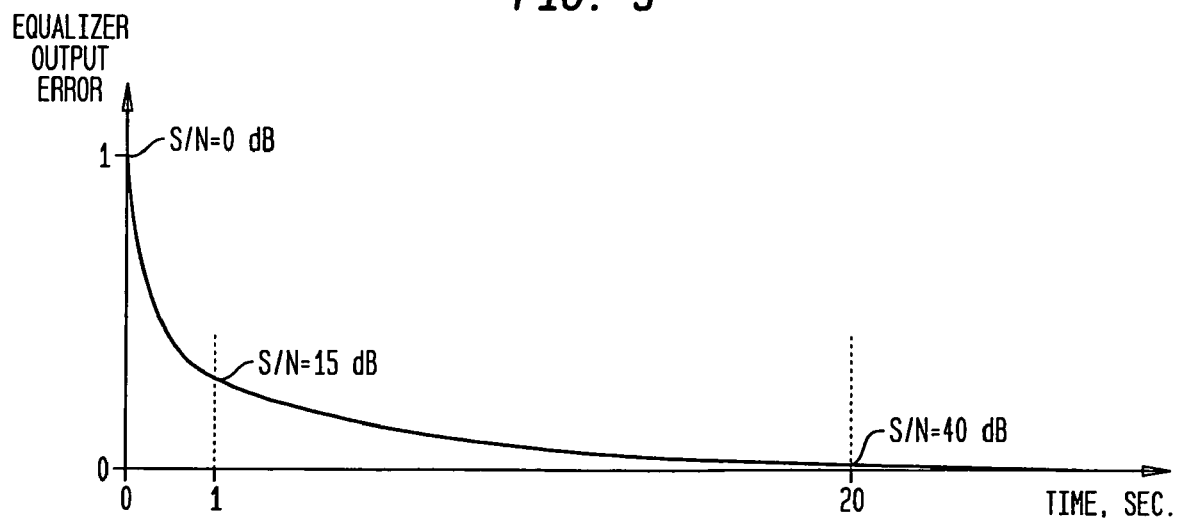
FIG. 5 is a graph illustrating an example of equalizer training in a data communication transceiver.

FIG. 5 is a graph illustrating an example of receiver training in a data communication transceiver. The graph of FIG. 5 indicates the equalizer output error versus time that may occur during training, and indicates signal-to-noise ratio at several points along the curve. Initially, at commencement of a data communication session at time $t=0$, the equalizer output error is 1 and the signal-to-noise ratio S/N=0 dB. As training progresses, the equalizer error decreases. Prior art data communication transceivers typically train their equalizers in their training mode until the signal-to-noise ratio S/N is in the range of 40 dB-50 dB. In order to achieve a signal-to-noise ratio greater than 40 dB, equalizer training time of 20 seconds or more may be required. Thus, initial training and subsequent retraining periods in the prior art system of FIGS. 3 and 4 may each be on the order of 20 seconds. During the retraining period $(t_2, t_3)$ of FIG. 3, even though the communication environment would support data communication at rate $S_2$, no user data is communicated.

Figure 6:
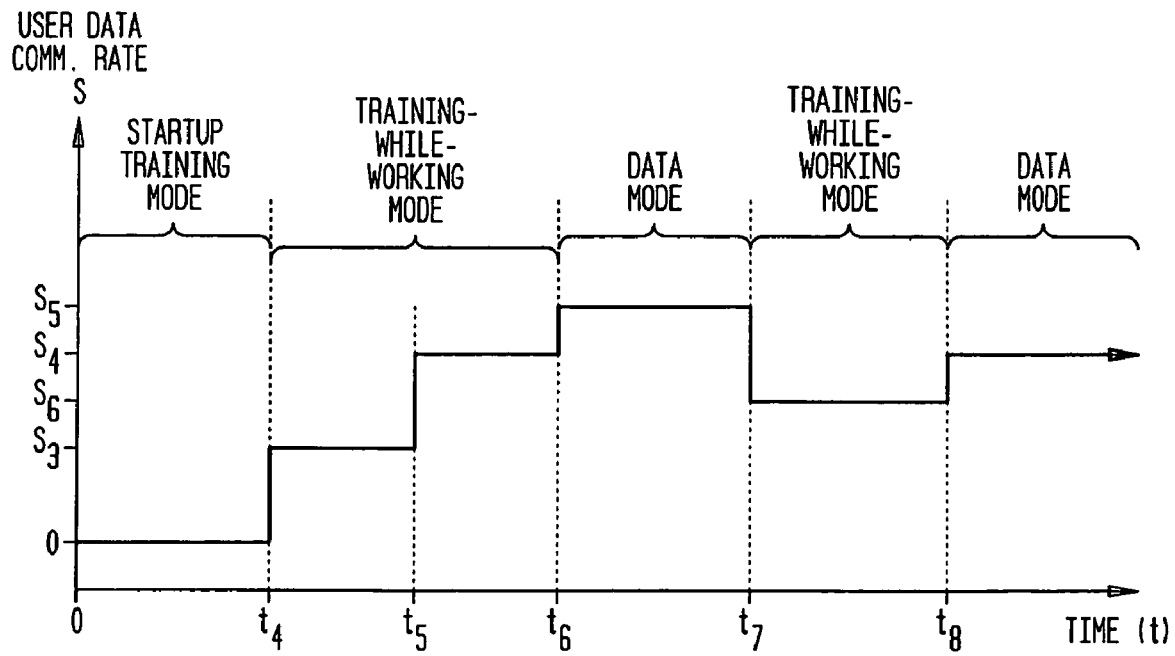
FIG. 6 is a graph illustrating the operation of a data communication transceiver in accordance with a preferred embodiment of the present invention.
Figure 7:
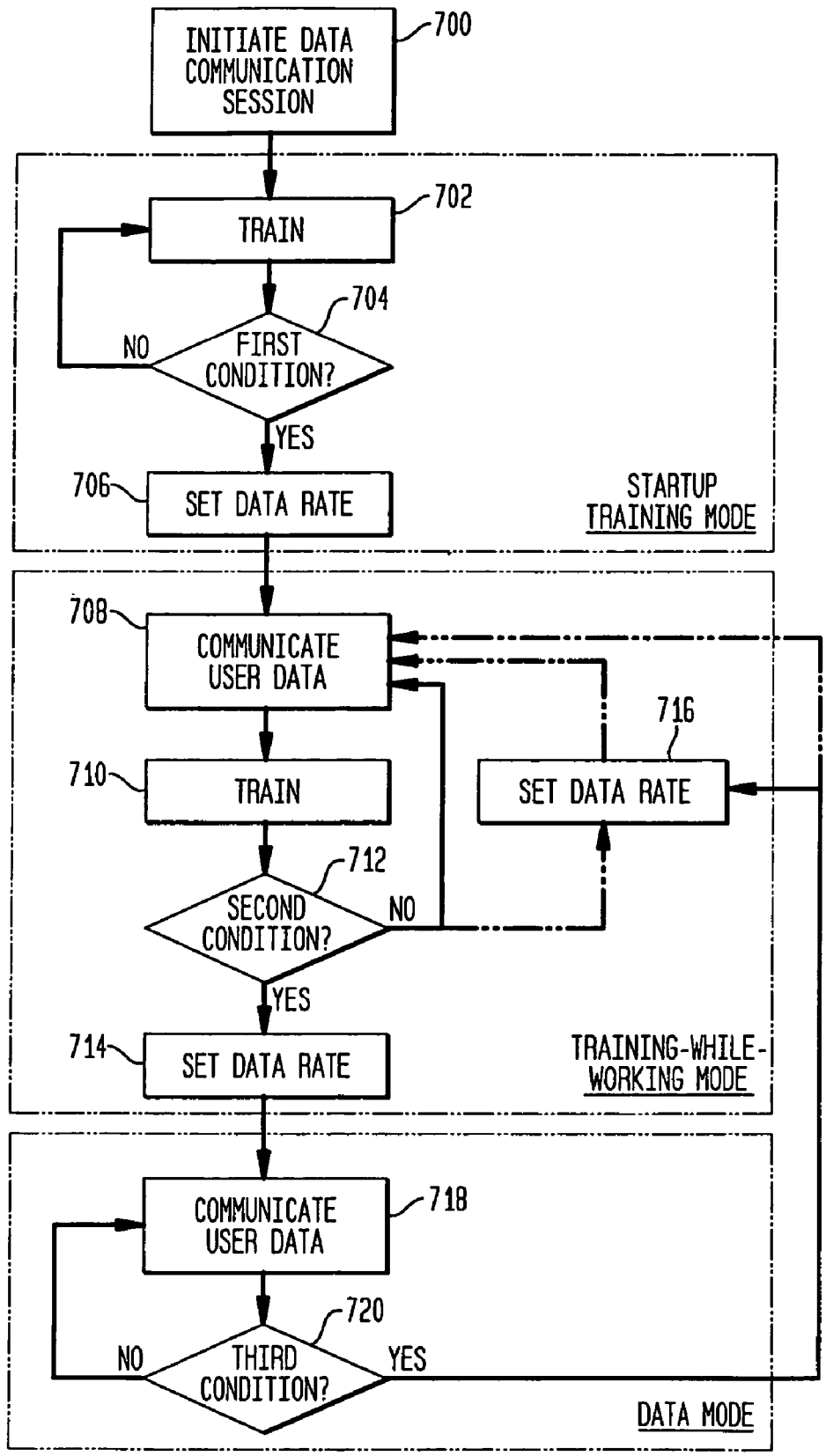
FIG. 7 is a flow diagram illustrating the operation of a data communication transceiver in accordance with a preferred embodiment of the present invention.

FIGS. 6 and 7 illustrate the operation of a data communication system in accordance with the present invention. FIG. 6 is a schematic diagram illustrating the operation of a data communication system comprising a data communication transceiver in accordance with the present invention, such as data communication transceiver 100A of FIG. 1, in a data communication session with another co-operating data communication transceiver, such as data communication transceiver 100B of FIG. 1. FIG. 6 is a graph of user data communication rate S versus time t that might occur in such a system between a transmitter 108A and a receiver 116B. FIG. 6 sets forth the operating state of the data communication transmitter and the receiver with which it is communicating during the time intervals depicted. FIG. 7 illustrates the operation of the data communication transceiver by means of a flow diagram. Both FIG. 6 and FIG. 7 will be referred to in the following discussion.

As indicated in FIG. 5, although training for 20 seconds or more may be required to achieve a signal-to-noise ratio S/N greater than 40 dB, lower signal-to-noise ratios may be achieved in a substantially shorter time. For example, a signal-to-noise ratio S/N of 15 dB may be achieved after training for only about 1 second. While a signal-to-noise ratio S/N of 40 dB may support data communication at a relatively high rate, at 8 bits per symbol for example, a signal-to-noise ratio S/N of 15 dB is adequate to support data communication at a relatively low rate, at 1 bit per symbol for example.

In view of the foregoing, the training time necessary to begin communicating user data after commencing a data communication session can be reduced by changing the training process. In accordance with the present invention, a data communication transceiver is operable in a mode in which it both trains and communicates user data, i.e., a "training-while-working" mode. In accordance with certain embodiments of the present invention, upon initiation of a data communication session, the data communication transceiver operates in a startup training mode in which partial training is performed using predetermined training signals. Upon the occurrence of a first condition corresponding to training sufficient to enable low-rate data communication, the data communication transceiver enters the training-while-working mode in which it communicates user data and completes training. Upon the occurrence of a second condition corresponding to completion of training, the data communication transceiver enters the data mode. In accordance with certain embodiments of the present invention, if in the data mode a third conditions occurs corresponding to a requirement for or the desirability of retraining, the data communication transceiver returns to the training-while-working mode and retrains while continuing to communicate user data. In accordance with a preferred embodiment, illustrated in FIGS. 6 and 7, a data communication transceiver enters a training-while-working mode both from a startup training mode for completion of training and from a data mode for retraining.

The invention may be used in systems wherein the receivers of each of a pair of data communication transceivers are simultaneously trained in a data communication session, and wherein each transceiver operates in the same mode as the other. For instance, in such a system, after initiation of a data communication session, transmitter 108A and receiver 116B operate in the startup training mode training receiver 116B for "downstream" communications, transmitter 108B and receiver 116A operate in the startup training mode training receiver 116A for "upstream" communications, and both the "upstream" and "downstream" communicating transmitter-receiver pairs exit the startup training mode at the same time. However, such operation is not necessarily the case, and the invention may be used in systems where "upstream" communications and "downstream" communications are not necessarily in the same mode. For example, the "upstream" receiver might complete startup training more quickly than the "downstream" receiver, and the "upstream" transmitter-receiver pair might exit the startup training mode while the "downstream" transmitter-receiver pair remains in the startup training mode. For another example, if the "upstream" communication environment deteriorates while the "downstream" communication environment remains constant, the "upstream" transmitter-receiver pair might exit the data mode and enter the training-while-working mode for retraining while the "downstream" transmitter-receiver pair remains in the data mode. For another example, a pair of data communication transceivers might operate with "upstream" communication in accordance with the present invention and "downstream" communication in accordance with the prior art, including "downstream" communication in which no training of the receiver is performed. Thus, while the following discussions may refer to the modes of operation of data communication transceivers 100A and 100B in connection with "downstream" communications from transmitter 108A to receiver 116B, it should be understood that transceivers 100A and 100B may be in the same mode or a different mode with respect to "upstream" communications from transmitter 108B to receiver 116A.

With reference to FIGS. 6 and 7, upon initiation of a data communication session (step 700 in FIG. 7; t=0 in FIG. 6), the data communication transceiver operates in a startup training mode illustrated in steps 702-706. As in the prior art training mode, training in step 702 in the startup training mode of the present invention is performed using predetermined signals 110A as training signals, and training is performed until a first condition occurs. However, in the present invention, such condition is selected to correspond to training sufficient to enable relatively low-rate data communication, that is, communication at a rate that is low compared to the rate that could be supported if the data communication transceiver were fully trained. The first condition may be a signal-to-noise ratio greater than an amount X, and training step 702 may be performed until a determination is made in step 704 that S/N>X. A signal-to-noise ratio of 14.5 dB provides a bit error rate less than $10^{-6}$ for 4-point quadrature amplitude modulation ("QAM") or 2-level PCM, and so X might for example be selected to be about 15 dB in systems using such modulation techniques. The first condition may be the passage of an amount of time that is expected to be sufficient for training that is adequate for low-rate data communication. The value of signal-to-noise ratio, time, or other first condition selected for a particular application will depend on design considerations and the characteristics of the application. When in step 704 the first condition is determined to exist, a data rate $S_3$ for use in user data communications is set in step 706. Data rate-setting step 706 may comprise establishing a symbol constellation for use in the training-while-working mode, based on the performance of the receiver as trained in the startup training mode. As in the prior art training mode, no user data is communicated in the startup training mode of the present invention.

After startup training and setting a user data rate, the data communication transceiver exits the startup training mode and enters the training-while-working mode, which occurs at time $t_4$. The training-while-working mode is illustrated in steps 708-716 of FIG. 7. In step 708 communication of user data commences at the initial rate $S_3$ that was set in step 706. Further training is performed in step 710; preferably, such training is performed by the receiver being trained using user data it receives. Such training may comprise a receiver 116B receiving signals 114B corresponding to transmitted symbols 110A representing user input data 106A; determining the transmitted symbols 110A corresponding to the received signals 114B; and adjusting its signal processing functions so that the received signals 114B are processed to provide symbols and/or output data 118B corresponding to the user input data 106A. Training in the training-while-working mode might also include training using predetermined signals as in the prior art; for instance, in an internet session, intervals may occur in which there is no user data to be communicated in one or both directions, and if such an interval occurs during training-while-working, training might proceed using predetermined signals until user data is presented for transmission.

Training in step 710 proceeds until a determination is made in step 712 that a second condition exists. The second condition is selected to correspond with completion of training. The second condition may be a signal-to-noise ratio greater than an amount Y, and training step 710 may be performed until a determination is made in step 712 that S/N>Y. Y might for example be selected to be in the range of about 40-50 dB, comparable to the signal-to-noise ratio resulting from fully training a prior art transceiver as described above. The second condition might be full or substantially full training of the data communication transceiver, i.e., when continued training provides little or no improvement in signal-to-noise ratio or some other measure of performance. The second condition may be a bit error rate less than a certain amount. The second condition may be the passage of an amount of time that is expected to be sufficient for full training. The value of signal-to-noise ratio or other second condition selected for a particular application will depend on design considerations and the characteristics of the application.

Until the second condition is satisfied, the process of FIG. 7 remains in the training-while-working mode, in which user data continues to be communicated in step 708 and training continues in step 710. All user data communication in the training-while-working mode may occur at the same rate $S_3$ that was set when the training-while-working mode was entered; such operation is indicated in FIG. 7 by the solid-line path from condition-determining step 712 to data communication step 708. However, in a preferred embodiment, rather than transmitting all user data in the training-while-working mode at the same rate $S_3$, the process follows the broken-line path and proceeds from condition-determining step 712 to data rate-setting step 716. Accordingly, the data rate for user data communication in the training-while-working mode may be increased if training has progressed sufficiently to support a higher data rate, or decreased if communication channel conditions have degraded and user data communication cannot be supported at the previous rate. For example, if S/N=15 dB at time $t_4$ and communication of user data commences at 1 bit/symbol, and after partial training S/N has increased to 30 dB, communication might be supportable at 6 bits/symbol, and the data rate might be increased to this rate. This aspect of the present invention is illustrated in FIG. 6 at time $t_5$, when the data rate is increased from $S_3$ to $S_4$ during the training-while-working interval ($t_4$, $t_6$). During a training-while-working interval, the data rate may be increased one or several times, decreased one or several times, or may undergo some combination of increases and decreases, depending on the communication environment during the interval. Thus the present invention provides, in a preferred embodiment, the capability of altering the data rate during training, which enables optimization of the amount of data transmitted while training is occurring. The data rate may thus adaptively match the communication channel capacity.

When in step 712 the second condition is determined to exist, a fully-trained data rate $S_5$ is set in step 714 for use in user data communications. Data rate-setting step 714 may comprise establishing a symbol constellation for use in the data mode, based on the performance of the receiver as trained in the training-while-working mode. Typically the symbol constellation is selected to provide the highest data rate supportable in the communication environment existing during the training-while-working period with the parameters to which the data communication transceiver was trained.

After the data communication transceiver is fully trained and a corresponding data rate is set, the transceiver exits the training-while-working mode and enters the data mode, which occurs at time $t_6$. The data mode is illustrated in steps 718-720 of FIG. 7. In step 718 user data is communicated at the rate $S_5$ set in step 714. As in the prior art data mode, the data rate is constant in the data mode of the present invention. Changes in the communication environment may occur which indicate a requirement for or the desirability of retraining, and step 720 determines whether a third condition exists indicating such a requirement for or the desirability of retraining. A requirement for retraining might exist when the data communication rate capability is less than the data mode data rate, and the desirability of retraining might exist when the data communication rate capability is greater than the data mode data rate.

The third condition whose occurrence is determined in step 720 may be a condition that renders communication unsupportable at the data rate $S_5$ with an acceptable error rate. For instance, the third condition might be a signal-to-noise ratio less than a certain amount, or a certain decrease in signal-to-noise ratio occurring after entry into the data mode, or a bit error rate in excess of a certain amount. However, in a preferred embodiment of the present invention, the third condition may also include a condition that renders communication possible at a higher data rate, for example, a signal-to-noise ratio greater than a certain amount or an increase in signal-to-noise ratio occurring after entry into the data mode. The value of signal-to-noise ratio, signal-to-noise ratio change, bit error rate, or other third condition selected for a particular application will depend on design considerations and the characteristics of the application.

If in step 720 the third condition is determined to exist, the data communication transceiver exits the data mode and, instead of returning to a training mode in which no user data is transmitted as in the prior art, the preferred transceiver of the present invention returns to the training-while-working mode for retraining. This occurs at time $t_7$ in FIG. 6, which illustrates a response to a deterioration of the communication environment rendering data communication unsupportable at rate $S_5$. The data communication transceiver enters the training-while-working mode at step 716, in which the data rate is set at a lower rate $S_6$. User data communication continues in step 708 at rate $S_6$ determined in step 716 when retraining commences, which may be a predetermined low rate but is preferably the highest rate that can be supported with the communication environment existing when retraining commences. Retraining in the training-while-working mode occurs in step 710, and operation in that mode proceeds as was previously described.

The transceiver might reenter the training-while-working mode for retraining under circumstances where the data rate need not be initially changed. For instance, if noise decreases sufficiently to enable an increase in the data rate, retraining can commence using user data being communicated at the same rate as it was communicated in the data mode. This situation is illustrated in FIG. 7 by the broken line portion of the path from step 720 to step 708.

By returning to the training-while-working mode for retraining, the present invention enables the user data rate to adaptively match the communication channel capacity throughout a data communication session, without interruption of the ability to communicate user data.

Startup training mode training step 702 may include training of various functional or circuit elements of the data communication transceiver including, as noted above, AGC, timing recovery, echo cancellation, equalization, and channel learning training, and initial training for other adaptive algorithms. In order to begin communication of user data as quickly as possible, the training performed in training step 702 should be selected to achieve the first condition (such as S/N>15 dB) as quickly as possible. Training may include the following.

On detection of a carrier signal, the data communication transceiver's receiver may be started, and training may commence. The AGC function may be trained by collecting a few symbol lengths from the output of the A/D converter, calculating the peak and mean square energy of the waveform, and adjusting the AGC gain so that the waveform at the input of the A/D converter is in an acceptable range for the A/D converter. The equalizer startup training may include partial coefficient training, e.g., central tap training for a linear equalizer or decision feedback equalizer, a fast convergence adaptive algorithm to train coefficients (e.g., equalizer step size), or an initial-value estimation algorithm (e.g., central tap estimation for a linear equalizer). If timing shifting in the expected duration of the startup training interval is sufficiently small, it can be ignored in the startup training mode and timing recovery training can be omitted from startup training and begin in the training-while-working mode. In most data communication system designs, timing shifting in periods on the order of one second is very small, and for data communication transceivers designed for such systems to complete startup training in about one second, timing recovery training can be deferred until the training-while-working mode. The timing recovery circuit can use an estimated initial value during startup training mode. If the echo energy is sufficiently low (for example, more than 15 dB below the signal energy in a system wherein startup training is performed until S/N>15 dB), then echo cancellation training is not necessary in the startup training mode. The echo cancellation circuit can be disabled in the startup training mode, or the echo cancellation circuit can operate using an estimated initial value during the startup training interval. An echo cancellation estimated initial value may be selected to cancel near echo in the startup training mode, and training to cancel both near and far echo may be performed in the training-while-working mode. Channel learning and other adaptive algorithms need not operate in the startup training mode, and can be started in the training-while-working mode.

Training in step 710 of the training-while-working mode may include fine training of AGC, timing recovery, echo cancellation, equalization, channel learning, and other adaptive algorithms.

Figure 8:
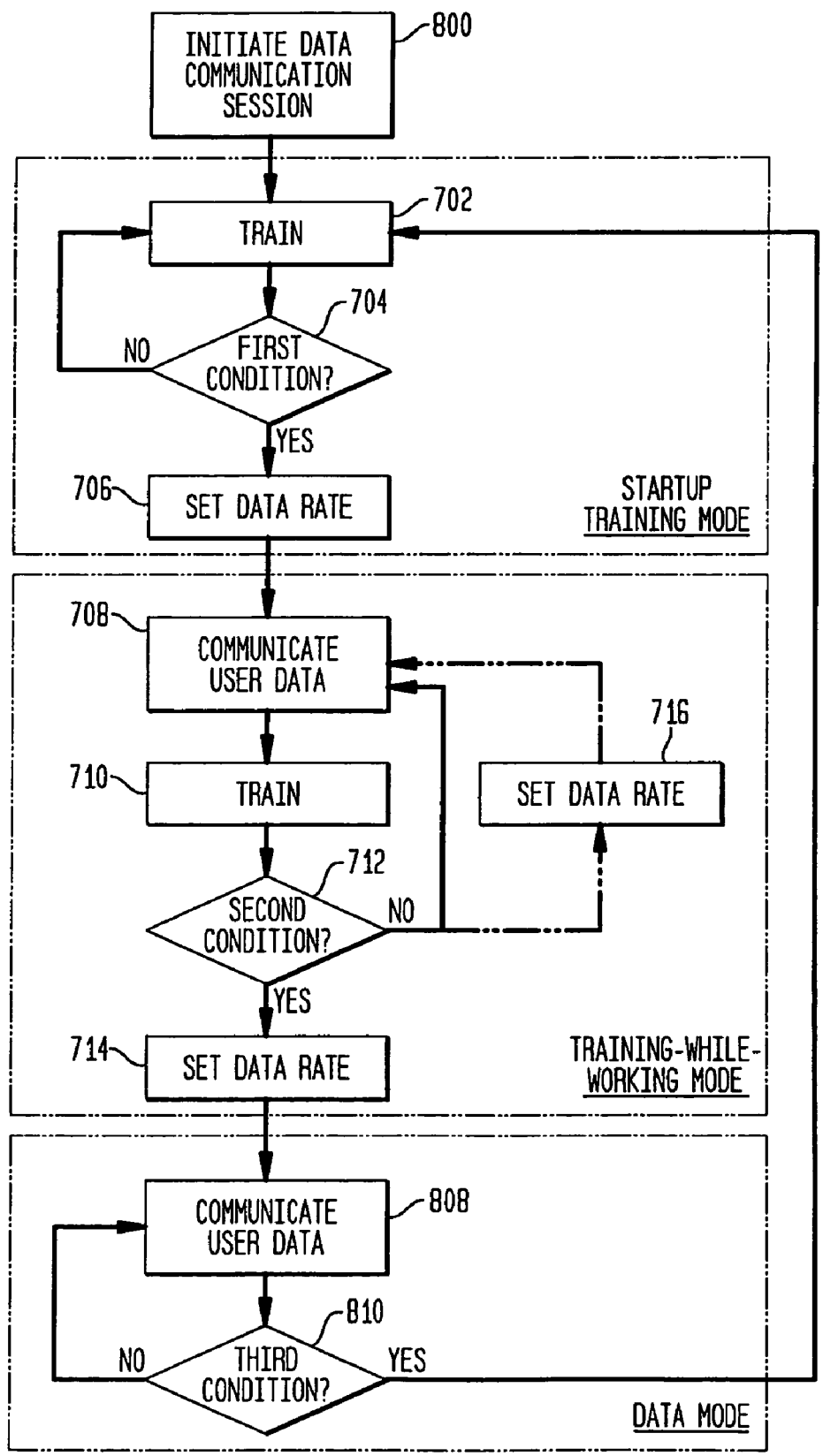
FIG. 8 is a flow diagram illustrating the operation of a data communication transceiver in accordance with another embodiment of the present invention.
Figure 9:
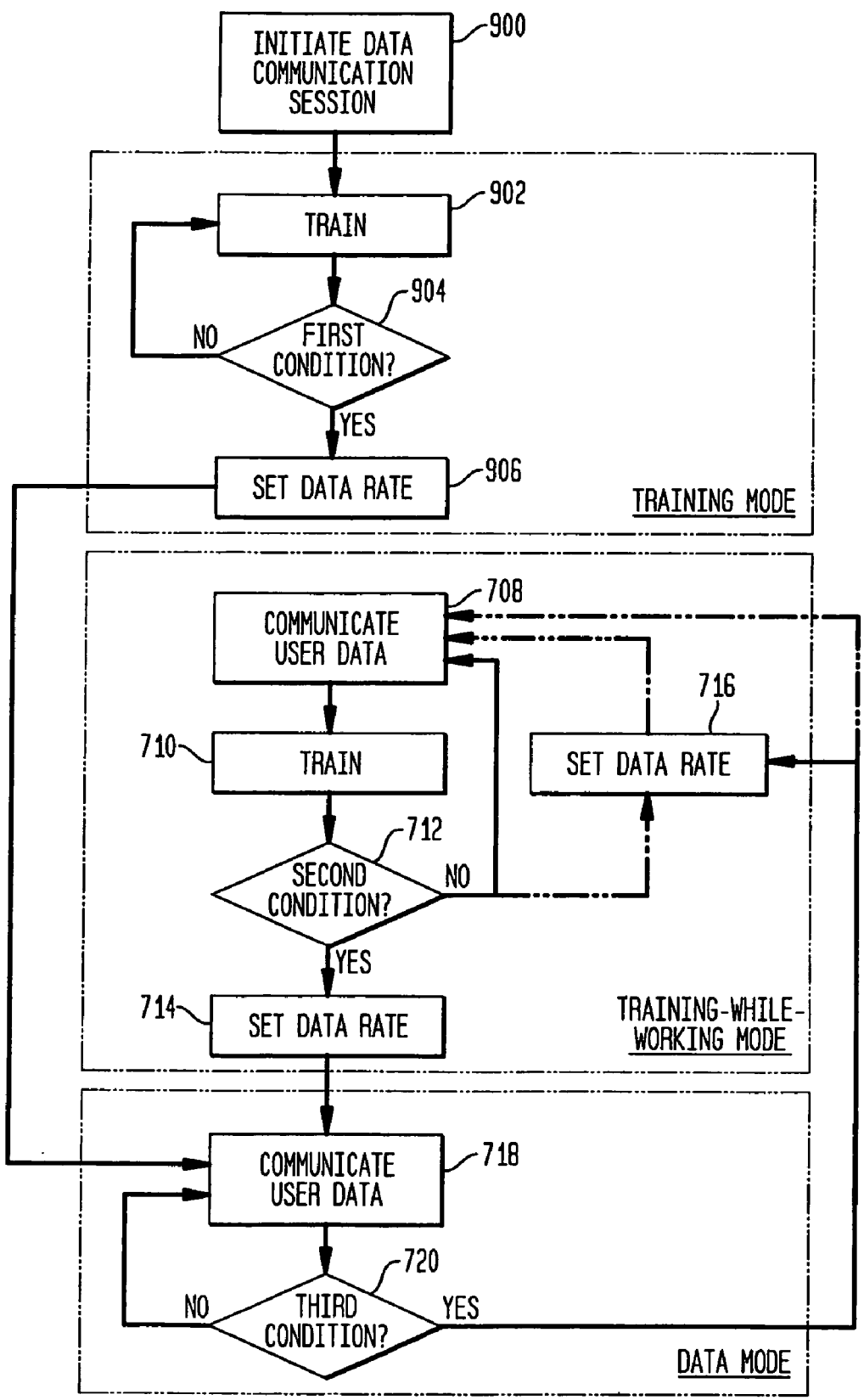
FIG. 9 is a flow diagram illustrating the operation of a data communication transceiver in accordance with another embodiment of the present invention.

FIGS. 8 and 9 are flow diagrams illustrating the operation of a data communication transceiver in accordance with other embodiments of the present invention. Each includes some, but not all, of the features of the embodiment of FIG. 7. In FIG. 8, after a data communication session is initiated in step 800, the data communication transceiver operates in a startup training mode and then in a training-while-working mode as described above with respect to FIG. 7. The data communication transceiver then enters a data mode similar to that described with respect to FIG. 4. That is, when the data communication transceiver determines in step 810 that a condition exists indicating that data communication is not supportable at the rate established for the data mode, the data communication transceiver reenters the startup training mode for retraining, during which no user data is communicated.

In FIG. 9, after a data communication session is initiated in step 900, the data communication transceiver operates in a training mode similar to that described with respect to FIG. 4. That is, training is performed in training step 902 until the data communication transceiver determines in step 904 that a condition exists corresponding to its receiver being fully trained. The data communication transceiver then enters the data mode. As in FIG. 7, if the data communication transceiver determines in step 720 that a condition exists indicating that data communication is not supportable at the rate established for the data mode, the data communication enters a training-while-working mode for retraining, during which user data is communicated.

In view of the foregoing, data communication using embodiments of the present invention can provide a number of benefits. These include fast connection, retraining without disconnection, and/or the ability to change data rate to match the channel capacity while transmitting user data.

FIGS. 7-9 represent the invention in a schematic manner. For instance, although FIGS. 7-9 illustrate the steps as occurring sequentially, this is not necessarily the case, and some or all of the steps in each mode may be performed simultaneously. For example, the data communication step, the training step, and/or the condition-determining step in a mode might occur simultaneously, and FIGS. 7-9 should not be understood to require sequential performance. Moreover, the inclusion of certain steps in a description of an operating mode may be primarily a matter of convenience; for instance, data rate-setting steps might be as easily considered to be final steps of one mode or initial steps of a following mode. Although the foregoing description refers to PCM and QAM, the invention is not limited to these forms of modulation, and may be used with any form of modulation.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A data communication transceiver operable in at least first and second modes, the first mode being a data mode during which user data is communicated at a first data rate, and the second mode being a training-while-working mode during which transceiver training occurs and user data is communicated at a second data rate slower than the first data rate;

wherein said data communication transceiver is further operable in a startup training mode in which transceiver training occurs and no user data is communicated, wherein said transceiver enters said startup training mode upon initiation of a data communication session, and upon the occurrence of a first condition corresponding to partial training, said transceiver exits said startup training mode and enters said training-while-working mode.

2. The invention of claim 1, wherein said transceiver training includes training performed using said user data.

3. The invention of claim 1, wherein said transceiver training includes training performed using predetermined signals.

4. The invention of claim 1, wherein said transceiver enters said training-while-working mode within about one second after said transceiver enters said startup training mode.

5. The invention of claim 1, wherein, during said data mode, transceiver training does not occur and user data is communicated; and wherein said transceiver exits said training-while-working mode and enters said data mode upon the occurrence of a second condition corresponding to completion of training.

6. The invention of claim 1, wherein, during said data mode, transceiver training does not occur and user data is communicated; and wherein said transceiver exits said data mode and enters said training-while-working mode upon the occurrence of a third condition.

7. The invention of claim 6, wherein said third condition corresponds to said data communication transceiver having a data communication rate capability greater than or less than said second data rate.

8. The invention of claim 1, wherein the rate of communication of user data in said training-while-working mode is variable.

9. A method of operating a data communication transceiver, comprising the steps of
   (a) communicating user data at a first data rate during a first mode, the first mode being a data mode; and
   (b) communicating user data at a second data rate slower than the first data rate and training said data communication transceiver during a second mode, the second mode being a training-while-working model,
   further comprising the step of training said data communication transceiver in a startup training mode in which transceiver training occurs and no user data is communicated, wherein said transceiver enters said startup training mode upon initiation of a data communication session, and upon the occurrence of a first condition corresponding to partial training, said transceiver exits said startup training mode and enters said training-while-working mode.

10. The invention of claim 9, wherein said training step includes training performed using said user data.

11. The invention of claim 9, wherein said training step includes training performed using predetermined signals.

12. The invention of claim 9, wherein said transceiver enters said training-while-working mode within about one second after said transceiver enters said startup training mode.

13. The invention of claim 9, wherein, during said data mode, transceiver training does not occur; wherein said transceiver exits said training-while-working mode and enters said data mode upon the occurrence of a second condition corresponding to completion of training.

14. The invention of claim 9, further comprising the step of communicating user data in said data mode, wherein said transceiver exits said data mode and enters said training-while-working mode upon the occurrence of a third condition.

15. The invention of claim 14, wherein said third condition corresponds to said data communication transceiver having a data communication rate capability greater than or less than said second data rate.

16. The invention of claim 9, wherein the rate of communication of user data in said training-while-working mode is variable.

17. A data communication transceiver operable in at least first and second modes, the first mode being a data mode during which user data is communicated at a first data rate, and the second mode being a training-while-working mode during which transceiver training occurs and user data is communicated at a second data rate slower than the first data rate, wherein, during said data mode, transceiver training does not occur and user data is communicated; and wherein said transceiver exits said training-while-working mode and enters said data mode upon the occurrence of a second condition corresponding to completion of training.

18. The invention of claim 17, wherein said transceiver training includes training performed using said user data.

19. The invention of claim 17, wherein said transceiver training includes training performed using predetermined signals.

20. The invention of claim 17, wherein the rate of communication of user data in said training-while-working mode is variable.

21. A data communication transceiver operable in at least first and second modes, the first mode being a data mode during which user data is communicated at a first data rate, and the second mode being a training-while-working mode during which transceiver training occurs and user data is communicated at a second data rate slower than the first data rate, wherein, during said data mode, transceiver training does not occur and user data is communicated; and wherein said transceiver exits said data mode and enters said training-while-working mode upon the occurrence of a third condition.

22. The invention of claim 21, wherein said third condition corresponds to said data communication transceiver having a data communication rate capability greater than or less than said second data rate.

23. The invention of claim 21, wherein, during said data mode, transceiver training does not occur and user data is communicated; and wherein said transceiver exits said training-while-working mode and enters said data mode upon the occurrence of a second condition corresponding to completion of training.

24. The invention of claim 21, wherein said transceiver training includes training performed using said user data.

25. The invention of claim 21, wherein said transceiver training includes training performed using predetermined signals.

26. The invention of claim 21, wherein the rate of communication of user data in said training-while-working mode is variable.

27. A method of operating a data communication transceiver, comprising the steps of
(a) communicating user data at a first data rate during a first mode, the first mode being a data mode; and
(b) communicating user data at a second data rate slower than the first data rate and training said data communication transceiver during a second mode, the second mode being a training-while-working mode, wherein, during said data mode, transceiver training does not occur; wherein said transceiver exits said training-while-working mode and enters said data mode upon the occurrence of a second condition corresponding to completion of training.

28. The invention of claim 27, wherein said transceiver training includes training performed using said user data.

29. The invention of claim 27, wherein said transceiver training includes training performed using predetermined signals.

30. The invention of claim 27, wherein the rate of communication of user data in said training-while-working mode is variable.

31. A method of operating a data communication transceiver, comprising the steps of
(a) communicating user data at a first data rate during a first mode, the first mode being a data mode; and
(b) communicating user data at a second data rate slower than the first data rate and training said data communication transceiver during a second mode, the second mode being a training-while-working mode, wherein, during said data mode, transceiver training does not occur and user data is communicated; and wherein said transceiver exits said data mode and enters said training-while-working mode upon the occurrence of a third condition.

32. The invention of claim 31, wherein said third condition corresponds to said data communication transceiver having a data communication rate capability greater than or less than said second data rate.

33. The invention of claim 31, wherein, during said data mode, transceiver training does not occur and user data is communicated; and wherein said transceiver exits said training-while-working mode and enters said data mode upon the occurrence of a second condition corresponding to completion of training.

34. The invention of claim 31, wherein said transceiver training includes training performed using said user data.

35. The invention of claim 31, wherein said transceiver training includes training performed using predetermined signals.

36. The invention of claim 31, wherein the rate of communication of user data in said training-while-working mode is variable.

* * * * *

UNITED STATES PATENT AND TRADEMARK OFFICE
CERTIFICATE OF CORRECTION

PATENT NO. : 7,675,967 B2
APPLICATION NO. : 11/633373
DATED : March 9, 2010
INVENTOR(S) : Zhenyu Wang It is certified that error appears in the above-identified patent and that said Letters Patent is hereby corrected as shown below:

In column 12, line 23, please replace "model" with --mode--.

Signed and Sealed this

Twentieth Day of July, 2010

David J. Kappos
*Director of the United States Patent and Trademark Office*